US008248445B2

(12) United States Patent
Kudo

(10) Patent No.: US 8,248,445 B2
(45) Date of Patent: Aug. 21, 2012

(54) OPTICAL SCANNING APPARATUS AND IMAGE FORMING APPARATUS USING THE SAME

(75) Inventor: Genichiro Kudo, Utsunomiya (JP)

(73) Assignee: Canon Kabushiki Kaisha (JP)

( * ) Notice: Subject to any disclaimer, the term of this patent is extended or adjusted under 35 U.S.C. 154(b) by 500 days.

(21) Appl. No.: 12/590,719

(22) Filed: Nov. 11, 2009

(65) Prior Publication Data

US 2011/0002712 A1 Jan. 6, 2011

(30) Foreign Application Priority Data

Nov. 10, 2008 (JP) .................................. 2008-287639

(51) Int. Cl.
*B41J 2/447* (2006.01)
*G02B 26/10* (2006.01)

(52) U.S. Cl. ........................ 347/243; 347/244; 359/204.1

(58) Field of Classification Search .................. 347/243, 347/244; 359/204.1
See application file for complete search history.

(56) References Cited

U.S. PATENT DOCUMENTS

| | | | | |
|---|---|---|---|---|
| 6,476,846 B1 * | 11/2002 | Kashima et al. | .............. | 347/241 |
| 7,336,406 B2 * | 2/2008 | Kato | .......................... | 359/204.1 |
| 7,969,634 B2 * | 6/2011 | Watanabe et al. | .......... | 359/204.1 |

* cited by examiner

*Primary Examiner* — Omar Rojas
(74) *Attorney, Agent, or Firm* — Rossi, Kimms & McDowell LLP

(57) ABSTRACT

Provided is an optical scanning apparatus has a plurality of light emitting portions and an incident optical system including optical element, wherein each shape of optical surfaces in a main scanning section of optical elements is formed into a noncircular shape. When defining that W is a space between specific light emitting portions farthest from an optical axis in the main scanning direction, La is an optical path length between an aperture stop and a specific optical surface closest to the light source unit among the noncircular optical surfaces of the incident optical system, $f_1$ is a focal length of the incident optical system in the main scanning direction, and D is a light flux width in the main scanning direction of a light flux emitted from the specific light emitting portion in the main scanning direction on specific the optical surface, the equation $2D \geq |W \cdot La/2f_1| \geq D/8$ is satisfied.

9 Claims, 7 Drawing Sheets

OPTICAL SCANNING APPARATUS AND IMAGE FORMING APPARATUS USING THE SAME

BACKGROUND OF THE INVENTION

1. Field of the Invention

The present invention relates to an optical scanning apparatus and an image forming apparatus using the same. The present invention is suited to an image forming apparatus such as a laser beam printer, a digital copying machine, or a multi-function printer, which adopts an electrophotography process.

2. Description of the Related Art

Conventionally, in an optical scanning apparatus that is used for a laser beam printer or a digital copying machine, a light flux emitted from a light source unit is guided to a light deflecting device by an incident optical system.

In such optical scanning apparatus, high speed and high resolution can be achieved by increasing the number of light emitting portions of the light source unit.

There are conventionally proposed various optical scanning apparatuses that can achieve high speed and high resolution by increasing the number of light emitting portions of the light source unit (see Japanese Patent Application Laid-Open No. H09-26550, and Japanese Patent Application Laid-Open No. 2001-154128).

Japanese Patent Application Laid-Open No. H09-26550 discloses a technology for improving optical performance among a plurality of light fluxes by arranging a plurality of light emitting portions in a symmetric manner with respect to an optical axis of a collimator lens.

Japanese Patent Application Laid-Open No. 2001-154128 discloses a technology of adjusting a light source and a laser for improving optical performance among a plurality of light fluxes emitted from a plurality of light emitting portions on a surface to be scanned.

In the conventional optical scanning apparatuses described above, if a multibeam light source unit including a plurality of light emitting portions at positions far from the optical axis of an incident optical system in a main scanning direction is used for a light source unit, a focal position on the surface to be scanned of each light flux emitted from each light emitting portion of the multibeam light source unit is shifted so that a difference of spot diameter occurs between the light fluxes. Thus, there is a problem of deterioration of an image.

In addition, it is necessary to increase the number of lenses of the incident optical system so that the difference of the spot diameter between light fluxes does not occur. This causes not only problems of upsizing of the entire apparatus and complication thereof but also problems that sensitivity of the incident optical system is increased, and hence a performance deterioration due to a manufacturing error is increased.

It is supposed to use a light source unit including two light emitting portions having different distances from the optical axis of the collimator lens in the main scanning direction (due to designing and manufacturing errors) as the light source unit including a plurality of light emitting portions that are spaced apart from one another in the main scanning direction.

In this case, if a shape of a lens surface of the collimator lens forming the incident optical system is circular in the main scanning section, a field curvature in the main scanning direction occurs in the lens surface of the collimator lens.

In other words, a difference of condensing state in the main scanning direction occurs between two light fluxes that have passed through the lens surface of the collimator lens.

For example, a difference of parallelism in the main scanning direction occurs between two collimated light fluxes that have passed through the lens surface of the collimator lens.

The focal positions of the two light fluxes emitted from the two light emitting portions on the surface to be scanned differ from each other. As a result, the spot diameters of the two light fluxes on the surface to be scanned are different from each other, and this causes an image quality difference between images based on the two light fluxes emitted from the two light emitting portions.

SUMMARY OF THE INVENTION

It is an object of the present invention to provide an optical scanning apparatus and an image forming apparatus using the same, which are capable of reducing a field curvature in a main scanning direction, which occurs when a plurality of light fluxes having been emitted from a plurality of light emitting portions that are spaced apart from one another in the main scanning direction pass through an incident optical system.

For achieving the above described object, one aspect of the present invention is an optical scanning apparatus, comprising: a light source unit including a plurality of light emitting portions that are spaced apart from one another in a main scanning direction; a deflection unit for deflecting a plurality of light fluxes emitted from the plurality of light emitting portions for scanning; an incident optical system for guiding the plurality of light fluxes emitted from the plurality of light emitting portions to the deflection unit; and an imaging optical system for forming images of the plurality of light fluxes deflected for scanning by a deflection surface of the deflection unit on a surface to be scanned, wherein: the incident optical system includes an optical element including at least one noncircular optical surface in a main scanning section, and an aperture stop for restricting a light flux width at least in the main scanning direction of the light flux entering the deflection unit, which are disposed in the stated order from a side of the light source unit; the noncircular optical surface in the main scanning section of the optical element has a shape in which a positive power decreases from on axis toward off axis; and when a space between light emitting portions that are located farthest from an optical axis in the main scanning direction among the plurality of light emitting portions of the light source unit is denoted by W (mm), an optical path length between the aperture stop and an optical surface that is closest to the light source unit among the at least one noncircular optical surface of the incident optical system in the main scanning section is denoted by La (mm), a focal length of the incident optical system in the main scanning direction is denoted by $f_1$ (mm), and a light flux width in the main scanning direction of the light flux that is emitted from the light emitting portion which is located farthest from the optical axis in the main scanning direction on the optical surface closest to the light source unit among the at least one noncircular optical surface in the main scanning section of the incident optical system is denoted by D (mm), the following expression is satisfied $$2D \geq |W \cdot La/2f_1| \geq D/8.$$

In the optical scanning apparatus as described above, it is preferable that the following expression is further satisfied $$8 \times f_1 > |La| > 2 \times f_1.$$

In addition, in the optical scanning apparatus as described above, it is preferable that the incident optical system includes a first optical element, a second optical element having a power in a sub scanning direction for forming images of the plurality of light fluxes that have passed through the first optical element on the deflection surface of the deflection unit as linear images elongated in the main scanning direction, and the aperture stop, which are disposed in the stated order from the side of the light source unit.

In such optical scanning apparatus, it is further preferable that the optical element including the at least one noncircular optical surface in the main scanning section is the first optical element.

Alternatively, it is also preferable that the optical element including the at least one noncircular optical surface in the main scanning section is the second optical element.

Furthermore, the optical scanning apparatus as described above, it is preferable that when an optical path length between the light source unit and the deflection surface of the deflection unit is denoted by L (mm), an optical path length between the aperture stop and the deflection surface of the deflection unit is denoted by M (mm), the following expression is satisfied $$0 < M/L < 0.6.$$

In addition, it is preferable that the plurality of light emitting portions includes four or more light emitting portions that are spaced from one another in the main scanning direction.

Furthermore, for achieving the above described object, one aspect of the present invention is an image forming apparatus, comprising: the optical scanning apparatus as described above; a photosensitive member disposed on the surface to be scanned; a developing device for developing an electrostatic latent image as a toner image that is formed on the photosensitive member with a light beam deflected for scanning by the optical scanning apparatus; a transferring device for transferring the developed toner image to a transfer material; and a fixing device for fixing the transferred toner image on the transfer material.

Alternatively, further aspect of the present invention is an image forming apparatus, comprising: the optical scanning apparatus as described above; and a printer controller for converting code data supplied from an external device into an image signal, which is supplied to the optical scanning apparatus.

According to the present invention, the field curvature in the main scanning direction can be reduced, which occurs when the plurality of light fluxes having been emitted from the plurality of light emitting portions that are spaced apart from one another in the main scanning direction pass through the incident optical system.

As a result, a variation in spot diameter on the surface to be scanned, of the plurality of light fluxes emitted from the plurality of light emitting portions that are spaced apart from one another in the main scanning direction, can be reduced.

Further features of the present invention will become apparent from the following description of exemplary embodiments with reference to the attached drawings.

DESCRIPTION OF THE EMBODIMENTS

First Embodiment

Figure 1:
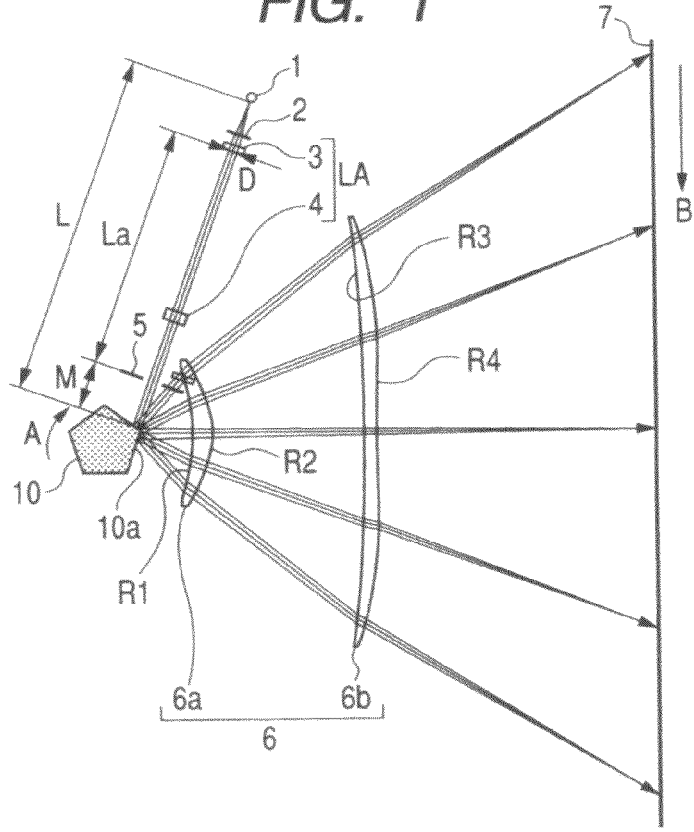
FIG. 1 illustrates a main scanning section according to a first embodiment of the present invention.
Figure 2:
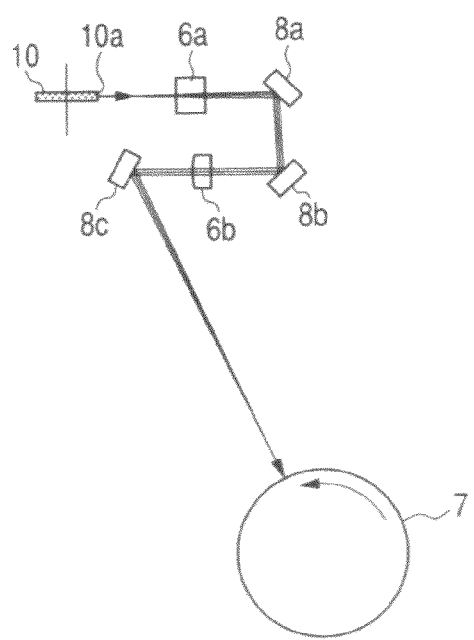
FIG. 2 illustrates a sub scanning section according to the first embodiment of the present invention.

FIG. 1 is a main portion sectional view of a main scanning direction (main scanning sectional view) according to a first embodiment of the present invention. FIG. 2 is a main portion sectional view of a sub scanning direction (sub scanning sectional view) according to the first embodiment of the present invention.

It should be noted that, in the description below, the sub scanning direction (Z direction) is a direction parallel to a rotational axis of a deflection unit. A main scanning section is a section in which the sub scanning direction (direction parallel to the rotational axis of the deflection unit) is a normal line. A main scanning direction (Y direction) is a direction in which light fluxes deflected for scanning by a deflection surface of the deflection unit are projected on the main scanning section. A sub scanning section is a section in which the main scanning direction is a normal line.

Figure 5:
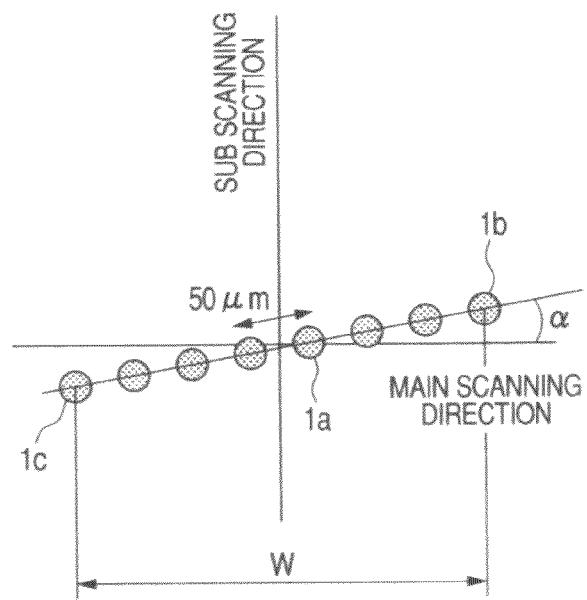
FIG. 5 is a schematic diagram of a light source unit according to the first embodiment of the present invention.

In the diagram, a light source unit 1 includes a semiconductor laser including a plurality of light emitting portions that are spaced apart from one another in the main scanning direction and in the sub scanning direction. One of the plurality of light emitting portions of the multibeam semiconductor laser 1 has a distance from the optical axis of a collimator lens 3 in the main scanning direction, which is different from a distance from the optical axis, of another one of the plurality of the light emitting portions. The semiconductor laser 1 includes an 8-beam laser in which eight light emitting portions are arranged in one-dimensional manner so as to be spaced apart from one another in the main scanning direction and in the sub scanning direction as illustrated in FIG. 5.

The first aperture stop (sub scanning stop) 2 restricts the light flux width of the passing light flux in the sub scanning direction so as to shape the beam shape. The first optical element 3 converts the light flux emitted from the light source unit 1 into a collimated light flux, and includes a glass mold lens manufactured by a molding process.

The collimator lens 3 serving as the first optical element has an exit surface that corresponds to a lens surface (optical surface) having a rotational symmetrical noncircular surface, in which a convex (positive) power decreases from the lens optical axis toward the peripheral portion.

Thus, focal positions of light fluxes emitted from the plurality of light emitting portions on the surface to be scanned become the same so that spot diameters of the plurality of light fluxes on the surface to be scanned become the same. In addition, the diverged light flux emitted from the light source unit 1 is converted into a collimated light flux in the main scanning section and in the sub scanning section.

Note that the exit surface of the collimator lens 3 is the noncircular surface in the main scanning section in this embodiment, but this structure should not be interpreted as a limitation. The incident surface or both the surfaces may be the noncircular surface in the main scanning section.

A cylindrical lens 4 serves as a second optical element 4 that has a power only in the sub scanning direction and is manufactured by the molding process. The cylindrical lens 4 works so that the light flux having passed through the collimator lens 3 forms, in the sub scanning section, an image elongated in the main scanning direction on a deflection surface 10a of a light deflecting device 10.

It should be noted that the collimator lens 3 and the cylindrical lens 4 may be formed of an anamorphic lens serving as one combined optical element. The anamorphic lens has both a collimate function of making different from each other a power in the main scanning direction and a power in the sub scanning direction, and a function of forming an image on the deflection surface in the sub scanning direction.

A second aperture stop (main scanning aperture stop) 5 restricts the light flux width of the light flux entering the light deflecting device 10 in the main scanning direction.

In addition, the second aperture stop 5 makes the main light beams of the light fluxes from the individual light emitting portions be close to each other on the deflection surface 10a, to thereby reduce a jitter amount in the main scanning direction on the surface to be scanned, of the plurality of light fluxes emitted from the plurality of light emitting portions that are spaced apart from one another in the main scanning direction. The jitter amount in the main scanning direction indicates an imaging position difference in the main scanning direction among a plurality of spots imaged on the surface to be scanned.

Note that each of the first aperture stop 2, the collimator lens 3, the cylindrical lens 4, and the second aperture stop 5 constitutes an element of the incident optical system LA. The light deflecting device 10 includes a polygon mirror (rotational polygon mirror) having five surfaces, and is rotated at a constant speed in the direction of the arrow A in the diagram by a driving unit such as a motor (not shown). An imaging optical system 6 having a condensing function and fθ characteristics includes a first imaging lens 6a and a second imaging lens 6b.

The first imaging lens 6a and the second imaging lens 6b both include an anamorphic lens having a noncircular surface shape in the main scanning section. The imaging optical system 6 causes the light flux based on image information deflected for scanning by the deflection surface of the light deflecting device 10 to form an image on a photosensitive drum surface 7 as the surface to be scanned. Further, the imaging optical system 6 has a function as a face tilt compensating optical system for setting the deflection surface 10a of the light deflecting device 10 and the photosensitive drum surface 7 to be conjugate to each other in the sub scanning section. The photosensitive drum surface 7 serves as the surface to be scanned.

Eight light fluxes 1a, 1b, 1c . . . that are optically modulated in accordance with the image information and emitted from the light source unit 1 are restricted by the first aperture stop 2 concerning the light flux width in the sub scanning direction. Then, the eight light fluxes are converted by the collimator lens 3 into collimated light fluxes, which enter the cylindrical lens 4. The light flux having entered the cylindrical lens 4 exits with its condensing state not being changed in the main scanning section, and the light flux width thereof in the main scanning direction is restricted by the second aperture stop 5.

In addition, the light flux having entered the cylindrical lens 4 converges in the sub scanning section and the light flux width thereof in the main scanning direction is restricted by the second aperture stop 5, so as to form a linear image (linear image elongated in the main scanning direction) on the deflection surface 10a of the light deflecting device 10.

Then, each of the plurality of light fluxes deflected for scanning by the deflection surface 10a of the light deflecting device 10 forms a spot image by the imaging optical system 6 on the photosensitive drum surface 7.

Further, when the light deflecting device 10 is rotated in the direction of the arrow A, the photosensitive drum surface 7 is scanned with each of the plurality of light fluxes deflected for scanning by the deflection surface 10a of the light deflecting device 10 in the direction of the arrow B (in the main scanning direction) at a constant speed. Thus, a plurality of scanning lines are formed simultaneously for recording the image on the photosensitive drum surface 7 serving as a recording medium.

As illustrated in FIG. 2, three flat surface mirrors 8a, 8b, and 8c are disposed in the optical path from the light deflecting device 10 to the surface to be scanned 7. Thus, the optical path of the imaging optical system 6 can be folded in compact size, and hence the entire apparatus can be downsized.

The semiconductor laser 1 as the light source unit includes eight light emitting portions arranged in the one-dimensional direction at a pitch distance of 50 μm with a tilt angle α (α=9.2 degrees) from the main scanning direction as illustrated in FIG. 5.

In addition, the semiconductor laser 1 is supported by the incident optical system LA in a rotatable manner about the axis parallel to the optical axis, in order to adjust a beam spacing error due to an attachment error when the semiconductor laser 1 is assembled.

Note that FIG. 5 illustrates an off axis light emitting portion 1a that is closest to the axis, and off axis light emitting portions 1b and 1c farthest in the main scanning direction. The light emitting portions 1b and 1c are arranged in the main scanning direction in a symmetric manner with respect to the optical axis of the incident optical system LA.

W (mm) denotes a space between the light emitting portions 1b and 1c, which are farthest from the optical axis in the main scanning direction among the plurality of light emitting portions of the light source unit 1.

Note that the semiconductor laser including eight light emitting portions is used in this embodiment, but the present invention can be applied to other semiconductor laser including two or more light emitting portions that are disposed at different positions from each other with respect to the optical axis in the main scanning direction.

However, the problem to be solved by the present invention is inherent especially in a multibeam optical scanning apparatus having a larger distance from the optical axis to the light emitting portions in the main scanning direction.

Therefore, the present invention produces more effect when applied to a multibeam optical scanning apparatus including four or more light emitting portions that are disposed at different positions from one another with respect to the optical axis in the main scanning direction.

In terms of design, the off axis light emitting portion 1a that is closest to the axis and the off axis light emitting portions 1b and 1c farthest in the main scanning direction are disposed at different positions from one another with respect to the optical axis in the main scanning direction.

Accordingly, when the shape of the lens surface of the collimator lens 3 is circular in the main scanning section, a field curvature in the main scanning direction occurs in the lens surface of the collimator lens 3 with respect to a light flux a emitted from the off axis light emitting portion 1a that is closest to the axis and light fluxes b and c emitted respectively from the off axis light emitting portions 1b and 1c farthest in the main scanning direction. Note that the reference symbols a, b, and c of the light fluxes are added to distinguish the above-mentioned light fluxes emitted from the light emitting portions 1a, 1b, and 1c from one another in the description, and the reference symbols a, b, and c are not shown in the drawings.

In other words, a difference of condensing state in the main scanning direction occurs between the light flux a and the light fluxes b and c that have passed through the lens surface of the collimator lens.

A difference of parallelism in the main scanning direction occurs between the collimated light flux a and the collimated light fluxes b and c that have passed through the lens surface of the collimator lens.

As a result, focal positions of the light flux a and the light fluxes b and c on the surface to be scanned differ from each other, and thus there arises a problem that spot diameters of the light flux a and the light fluxes b and c on the surface to be scanned differ from each other.

Similarly, there arises a problem that the spot diameters of the light flux b and the light flux c on the surface to be scanned, which are emitted respectively from the off axis light emitting portions 1b and 1c farthest in the main scanning direction, which are arranged in the main scanning direction in a symmetric manner with respect to the optical axis of the incident optical system LA, differ from each other due to designing arrangement errors.

Optical parameters used in the incident optical system according to this embodiment are set as in Table 1.

In this embodiment, in the main scanning section, the exit surface of the collimator lens 3 is formed to be noncircular in which a positive power decreases from the axis toward the off axis, to thereby compensate for the field curvature on the surface to be scanned in the main scanning direction.

In addition, the collimator lens 3 has an incident surface provided with a weak convex power (r=100 mm) so as to be advantageous in molding the lens.

An expression for defining the lens shape of the collimator lens 3 is as follows.

$$X = \frac{h^2/R}{1 + \sqrt{1 - (h/R)^2}} + Ah^2 + Bh^4 + Ch^6 + Dh^8 + Eh^{10} + Fh^{12} + Gh^{14}$$

[Equation 1]

$$h = \sqrt{Y^2 + Z^2}$$

TABLE 1

|  | r | d | N(670 nm) |
|---|---|---|---|
| Light source (light emitting point) | 0.0000 | 18.7970 | 0.0000 |
| Sub scanning aperture stop |  | 4.0000 |  |
| Collimator lens | 100.0000 | 3.9800 | 1.5796 |
|  | −16.621* | 75.4800 | 0.0000 |
| Cylindrical lens | 0.0000 | 3.0000 | 1.5273 |
|  | 0.0000 | 33.0000 | 1.0000 |
| Main scanning aperture stop |  | 22.5000 |  |
| Deflection surface | 0.0000 | 0.0000 | 1.0000 |

| Aspheric surface coefficient | |
|---|---|
| A | 0.00E+00 |
| B | 2.30E−05 |
| C | 5.84E−08 |
| D | 0.00E+00 |
| E | 0.00E+00 |
| F | 0.00E+00 |
| G | 0.00E+00 |

*Aspheric surface

In addition, in the imaging optical system, the intersection of the imaging lens and the optical axis is regarded as the origin. As illustrated in FIG. 1, at the scanning start side and the scanning end side with respect to the optical axis of the imaging optical system, the optical axis is regarded as the X-axis, the direction perpendicular to the optical axis in the main scanning section is regarded as the Y-axis, and the direction perpendicular to the optical axis in the sub scanning section is regarded as the Z-axis. Then, the imaging optical system can be expressed by the following functions.

[Equation 2]

Scanning start side (a)

$$x = \frac{y^2/R}{1 + \sqrt{1 - (1+K)(y/R)^2}} + B_{4s}y^4 + B_{6s}y^6 + B_{8s}y^8 + B_{10s}y^{10}$$

[Equation 3]

Scanning end side (b)

$$x = \frac{y^2/R}{1 + \sqrt{1 - (1+K)(y/R)^2}} + B_{4e}y^4 + B_{6e}y^6 + B_{8e}y^8 + B_{10e}y^{10}$$

where R denotes the curvature radius and K, $B_4$, $B_6$, $B_8$, and $B_{10}$ denote aspheric surface coefficients.

In this embodiment, the shapes in the main scanning section, of the first imaging lens 6a and the second imaging lens 6b are formed symmetrically with respect to the optical axis.

In other words, aspheric surface coefficients of the first imaging lens 6a and the second imaging lens 6b on the scanning start side and on the scanning end side are made to be the same.

Each of the incident surface and the exit surface of the first imaging lens 6a, and the exit surface of the second imaging lens 6b is the noncircular surface in the main scanning section.

The incident surface of the second imaging lens 6b is the circular surface in the main scanning section.

Further, the curvature radii in the sub scanning direction of the incident surface R1 and the exit surface R2 of the first imaging lens 6a are constant without varying between the axis and the off axis.

The curvature radii in the sub scanning direction of the incident surface R3 and the exit surface R4 of the second imaging lens 6b vary between the axis and the off axis in an asymmetric manner.

With respect to the optical axis, on the scanning start side and the scanning end side, the optical axis is regarded as the X-axis, the direction perpendicular to the optical axis in the main scanning section is regarded as the Y-axis, and the direction perpendicular to the optical axis in the sub scanning section is regarded as the Z-axis. Then, the shape in the sub scanning section can be expressed by the following continuous functions.

The following continuous functions are functions that define the shapes in the sub scanning direction, of R1, R2, R3, and R4 surfaces.

$$S = \frac{z^2/r'}{1 + \sqrt{1-(z/r')^2}}$$
$$r' = r(1 + D_{2s}y^2 + D_{4s}y^4 + D_{6s}y^6 + D_{8s}y^8 + D_{10s}y^{10})$$
[Equation 4]

$$S = \frac{z^2/r'}{1 + \sqrt{1-(z/r')^2}}$$
$$r' = r(1 + D_{2e}y^2 + D_{4e}y^4 + D_{6e}y^6 + D_{8e}y^8 + D_{10e}y^{10})$$
[Equation 5]

where r' denotes the curvature radius in the sub scanning direction, $D_2$, $D_4$, $D_6$, $D_8$, and $D_{10}$ denote coefficients, s denotes a suffix of the coefficient of the scanning start side, and e denotes the scanning end side.

The curvature radius in the sub scanning direction corresponds to a curvature radius in the cross section orthogonal to the generatrix in the main scanning direction. In other words, the curvature radius in the sub scanning direction corresponds to a curvature radius in the cross section including a normal line on the generatrix of the lens surface.

The imaging optical system includes two imaging lenses in this embodiment, but this structure should not be interpreted to be a limitation. The imaging optical system may include one or three or more imaging optical elements.

Table 2 illustrates values of the optical scanning apparatus according to the first embodiment of the present invention. Here, "E-x" means "$10^{-x}$".

R1 surface is an incident surface of the first imaging lens 6a on the side of the light deflecting device 10. R2 surface is an exit surface of the first imaging lens 6a on the side of the surface to be scanned 7. R3 surface is an incident surface of the second imaging lens 6b on the side of the light deflecting device 10. R4 surface is an exit surface of the second imaging lens 6b on the side of the surface to be scanned 7.

Table 2 described below illustrates optical parameter values used in the imaging optical system of this embodiment.

TABLE 2

| | | |
|---|---|---|
| Using wavelength (mm) | | 6.70E−07 |
| Refractive index of imaging optical system | | 1.523972 |
| The number of surfaces of deflection unit | | 5 |
| diameter of circumcircle of deflection unit (mm) | | 34 |
| Rotation angle of deflection unit (±deg.) | | 24 |
| Incident angle in main scanning direction (deg.) | | 70 |
| Incident angle in sub scanning direction (deg.) | | 0 |
| On axis deflection point to incident surface of first imaging lens (mm) | | 2.65E+01 |
| Focal length of imaging lens (mm) | | 2.00E+02 |

| Rotational center coordinates of deflection unit | |
|---|---|
| X | −12.415 |
| Y | −6.247 |

| | | R1 surface | | | R2 surface | |
|---|---|---|---|---|---|---|
| | | Scanning start side (s) | Scanning end side (e) | | Scanning start side (s) | Scanning end side (e) |
| Main scanning section | d | 9.60E+00 | | d | 6.790E+01 | |
| | R | −7.12E+01 | | R | −4.16E+01 | |
| | K | 2.18E+00 K | 2.18E+00 | K | 6.43E−02 K | 6.43E−02 |
| | B4 | 3.69E−06 B4 | 3.69E−06 | B4 | 2.78E−06 B4 | 2.78E−06 |
| | B6 | 8.27E−11 B6 | 8.27E−11 | B6 | 1.18E−09 B6 | 1.18E−09 |
| | B8 | 1.96E−13 B8 | 1.96E−13 | B8 | 2.10E−13 B8 | 2.10E−13 |
| | B10 | 3.55E−17 B10 | 3.55E−17 | B10 | 2.07E−16 B10 | 2.07E−16 |
| Sub scanning section | r | −1.00E+03 | | r | −1.00E+03 | |
| | D2 | 0.00E+00 D2 | 0.00E+00 | D2 | 0.00E+00 D2 | 0.00E+00 |
| | D4 | 0.00E+00 D4 | 0.00E+00 | D4 | 0.00E+00 D4 | 0.00E+00 |
| | D6 | 0.00E+00 D6 | 0.00E+00 | D6 | 0.00E+00 D6 | 0.00E+00 |
| | D8 | 0.00E+00 D8 | 0.00E+00 | D8 | 0.00E+00 D8 | 0.00E+00 |
| | D10 | 0.00E+00 D10 | 0.00E+00 | D10 | 0.00E+00 D10 | 0.00E+00 |

TABLE 2-continued

|  |  | R3 surface | | | R4 surface | | |
|---|---|---|---|---|---|---|---|
|  |  | Scanning start side (s) | | Scanning end side (e) | | Scanning start side (s) | Scanning end side (e) |
| Main scanning section | d |  | 5.50E+00 |  | d |  | 1.27E+02 |
|  | R | −8.24E+02 |  |  | R | 7.68E+02 |  |
|  | K | −6.43E−02 | K | 0.00E+00 | K | −5.90E+02 K | −5.90E+02 |
|  | B4 | 0.00E+00 | B4 | 0.00E+00 | B4 | −2.57E−07 B4 | −2.57E−07 |
|  | B6 | 0.00E+00 | B6 | 0.00E+00 | B6 | 2.17E−11 B6 | 2.17E−11 |
|  | B8 | 0.00E+00 | B8 | 0.00E+00 | B8 | −1.48E−15 B8 | −1.48E−15 |
|  | B10 | 0.00E+00 | B10 | 0.00E+00 | B10 | 4.78E−20 B10 | 4.78E−20 |
| Sub scanning section | r | −1.00E+03 |  |  | r | −2.36E+01 |  |
|  | D2 | 0.00E+00 | D2 | 2.45E−06 | D2 | 7.01E−05 D2 | 1.25E−04 |
|  | D4 | 0.00E+00 | D4 | −1.68E−10 | D4 | −1.56E−08 D4 | −1.53E−08 |
|  | D6 | 0.00E+00 | D6 | 0.00E+00 | D6 | 2.16E−12 D6 | 2.83E−12 |
|  | D8 | 0.00E+00 | D8 | 0.00E+00 | D8 | −1.69E−16 D8 | −3.04E−16 |
|  | D10 | 0.00E+00 | D10 | 0.00E+00 | D10 | 5.61E−21 D10 | 1.06E−20 |

In this embodiment, the light emitting portion spacing in the main scanning direction, of the light emitting portion 1b and the light emitting portion 1c, which are farthest from the optical axis among the plurality of light emitting portions of the light source unit 1, is denoted by W (mm).

An incident surface of the collimator lens 3 is a spherical surface that is rotationally symmetrical to the optical axis. An exit surface of the collimator lens 3 is an aspheric surface that is rotationally symmetrical to the optical axis. The collimator lens 3 has the same focal length in the main scanning direction and in the sub scanning direction.

Further, a light flux width in the main scanning direction, of the light flux emitted from the light emitting portion, which is farthest from the optical axis in the main scanning direction, on the optical surface closest to the light source unit 1 among the noncircular optical surfaces of the incident optical system LA in the sub scanning direction is denoted by D (mm).

The light flux width D in this embodiment is a light flux width in the main scanning direction, of the light flux b emitted from the light emitting portion 1b, which is farthest from the optical axis in the main scanning direction, on the exit surface of the collimator lens 3, and is restricted by the aperture width of the second aperture stop 5.

Figure 9:
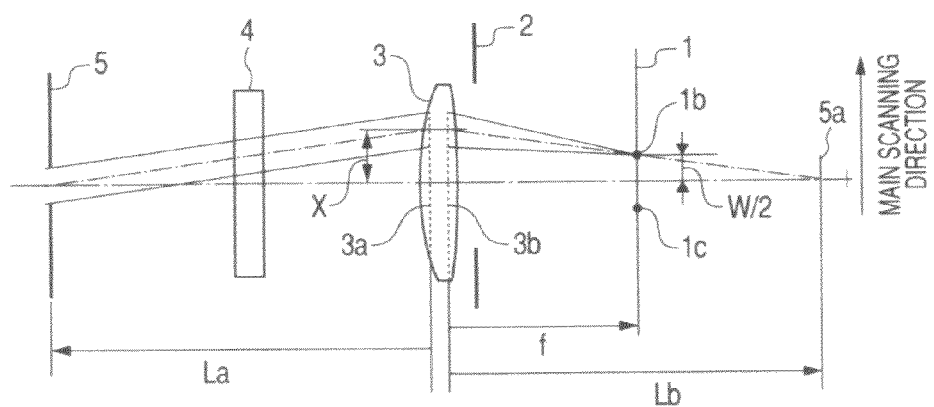
FIG. 9 illustrates a position of a light flux that passes through the collimator lens according to the first embodiment of the present invention.

Now, referring to FIG. 9 illustrating the main scanning section (X-Y section) of the incident optical system, calculation of a passage position X of the light flux b in the collimator lens 3 which has been emitted from the off axis light emitting portion 1b (FIG. 5) in the main scanning direction is described.

A passage position of the light flux c emitted from the off axis light emitting portion 1c (FIG. 5) can be calculated in a similar manner to the off axis light emitting portion 1b, and hence calculation of the passage position of the light flux c is omitted here.

Each optical element illustrated in FIG. 9 is denoted by the same numeral as used for the same optical element illustrated in FIG. 1 and FIG. 5.

FIG. 9 illustrates an entrance pupil position (conjugate position of the main scanning aperture stop with respect to the collimator lens 3) 5a, and a rear principal point 3a and a front principal point 3b of the collimator lens 3.

Further, $f_1$ (mm) denotes a focal length of the collimator lens 3, La (mm) denotes an optical path length from the rear principal point 3a to the second aperture stop 5, and Lb (mm) denotes an optical path length from the front principal point 3b to the entrance pupil position 5a.

A principal ray of the light flux b having been emitted from the off axis light emitting portion 1b of the light source unit 1 passes through the collimator lens 3 at a position that is x away from the optical axis of the collimator lens 3, and intersects with the optical axis of the collimator lens 3 at the second aperture stop 5. Accordingly, Expression A is obtained through paraxial calculation.

$$\frac{1}{Lb} = \frac{1}{La} + \frac{1}{f_1} \qquad \text{Expression A}$$

Then, Expression B is obtained through geometric calculation from the similarity of triangles.

$$\frac{Lb}{x} = \frac{Lb - f_1}{W/2} \qquad \text{Expression B}$$

Expression C is obtained by substituting Expression A into Expression B.

$$x = \frac{W \times La}{2 f_1} \qquad \text{Expression C}$$

In the derivation for Expression C, the influence of refraction by the cylindrical lens 4 is neglected because the cylindrical lens 4 is the optical element having no power in the main scanning direction.

Further, the optical path length from the light source unit 1 to the front principal point of the collimator lens 3 slightly deviates from f because of the influence of wave aberration, but the deviation is neglected.

Therefore, in the present invention, the optical path length La from the rear principal point 3a to the second aperture stop 5 is considered to approximate the optical path length from the noncircular exit surface of the collimator lens 3 in the main scanning section to the second aperture stop 5.

Accordingly, the space between the light emitting portions 1b and 1c, which are farthest from the optical axis in the main scanning direction among the plurality of light emitting portions of the light source unit 1, is denoted by W (mm), and the optical path length between the above-mentioned aperture stop and the optical surface that is closest to the light source unit 1 among the noncircular optical surfaces of the incident optical system LA in the main scanning section is denoted by La (mm).

The focal length of the incident optical system LA in the main scanning direction is denoted by $f_1$ (mm), and the light flux width in the main scanning direction, of each of the light fluxes emitted from the light emitting portions 1b and 1c, which are farthest from the optical axis in the main scanning direction, on the optical surface closest to the light source unit 1 among the noncircular optical surfaces of the incident optical system LA in the main scanning section is denoted by D (mm).

In this case, the individual elements are set so as to satisfy the following expression.

$$2D \geq |W \cdot La/2f_1| \geq D/8 \qquad (1)$$

Over the upper limit value of the conditional expression (1), an external shape of the collimator lens 3 is increased in the main scanning direction, leading to increase in size of the incident optical system, which is not appropriate.

Further, under the lower limit value of the conditional expression (1), on the noncircular lens surface in the main scanning section of the collimator lens 3, the amount x by which the principal ray of the light flux b emitted from the off axis light emitting portion 1b, which is farthest from the optical axis of the collimator lens 3, is away from the optical axis is reduced.

In this case, when the out-of-parallelism in the main scanning section occurring in the lens surface of the collimator lens 3 is to be compensated by forming the shape of the exit surface of the collimator lens 3 in the main scanning section into the noncircular shape in which a positive power continuously decreases from the axis toward the off axis, the effect of the aspheric surface cannot be used effectively.

The reason is as follows. The aspheric surface coefficients A, B, C, . . . are coefficients of the $h^4$ term, the $h^6$ term, the $h^8$ term, . . . , respectively, as expressed in Equation 1, and hence the effect of the aspheric surface can be used effectively more when the aspheric surface is applied with respect to the light flux passing through a position that is away from the optical axis than applied with respect to the light flux passing through the vicinity of the optical axis of the collimator lens 3.

h is set considering an amount x by which a light flux is away from the optical axis of the collimator lens 3. As a precondition, the aspheric surface coefficients A, B, C, . . . are determined taking into consideration the balance with respect to all of the optical parameters used in the optical scanning apparatus, which contribute to optical performances of the plurality of light fluxes on the surface to be scanned.

Therefore, the aspheric surface coefficients A, B, C, . . . cannot be dealt as design values for solving only the problem of the present invention.

In general, the multibeam optical scanning apparatus is designed such that a virtual light flux having been emitted from a virtual light emitting portion, which is arranged on the optical axis of the collimator lens 3, is converted into a completely collimated light flux by the collimator lens 3.

Accordingly, design is made such that the out-of-parallelism in the main scanning section occurring in the lens surface of the collimator lens 3 is reduced in the collimated light flux a emitted from the off axis light emitting portion 1a at a vicinity of the optical axis of the collimator lens 3 than in the collimated light flux b emitted from the off axis light emitting portion 1b, which is farthest from the optical axis of the collimator lens 3.

The off axis light emitting portion 1a is disposed at a vicinity of the optical axis of the collimator lens 3, and hence the amount x by which the light flux a is away from the optical axis at a time when the light flux a passes through the exit surface of the collimator lens 3, which is formed to be noncircular in the main scanning section, is reduced.

However, in the case of the light flux a emitted from the off axis light emitting portion 1a, the out-of-parallelism in the main scanning section occurring in the lens surface of the collimator lens 3 is small, and hence no problem arises when a compensation amount therefor by the effect of the aspheric surface is small.

The technical meaning of the conditional expression (1) is described below.

By making larger the value of $|W \cdot La/2f|$ in the conditional expression (1), the space amount x between the optical axis and the principal ray of the light flux b emitted from the off axis light emitting portion 1b, which is farthest from the optical axis of the collimator lens 3, can be increased.

Accordingly, the effect of the aspheric surface produced by forming the shape of the exit surface of the collimator lens 3 in the main scanning section into the noncircular shape in which the positive power continuously decreases from the axis toward the off axis can be used effectively.

To make larger the value of $|W \cdot La/2f_1|$, it is only necessary to make larger the values of |La| and W, or smaller the value of $f_1$.

However, the value of W is restricted by a scanning line pitch on the surface to be scanned.

Accordingly, in this embodiment, by satisfying "|La|>2× $f_1$", the space amount x between the optical axis and the main light beam of the light flux b emitted from the off axis light emitting portion 1b, which is farthest from the optical axis of the collimator lens 3, is increased.

In this embodiment, in order to increase the space amount x, "|La|>80 mm" can be appropriately set.

In order to prevent the optical path length of the incident optical system from being large to increase the incident optical system in size, "8×$f_1$>|La|" and "200 mm>|La|" are preferred to be set.

Accordingly, the individual elements are set so as to satisfy the following expression.

$$8 \times f_1 > |La| > 2 \times f_1 \qquad (2)$$

In this embodiment, it is preferred that the value of W satisfy "0.25<W<1".

Under the lower limit value of W, there arises a problem of crosstalk between light fluxes emitted from adjacent light emitting portions. Over the upper limit value of W, there arises a problem that the optical system of the optical scanning apparatus has a low degree of design freedom when the scanning line pitch (resolution) on the surface to be scanned is attained.

Taking into consideration a size of the spot diameter on the surface to be scanned in the main scanning direction, in this embodiment, it is preferred that the value of D satisfy "2<D<8".

In addition, the optical path length from the light source unit 1 to the deflection surface 10a of the light deflecting device 10 is denoted by L (mm), and the optical path length from the second aperture stop 5 to the deflection surface 10a of the light deflecting device 10 is denoted by M (mm). Here, the optical path length to the deflection surface corresponds to an optical path length to the point where a central light flux of the light flux enters the deflection surface when the deflection surface scans the center of the scanning range on the surface to be scanned.

In order to reduce the jitter amount in the main scanning direction on the surface to be scanned, of the plurality of light fluxes emitted from the plurality of light emitting portions that are spaced from one another in the main scanning direction, the individual elements are set so as to satisfy the following conditional expression.

$$0<M/L<0.6 \quad (3)$$

When the value of M is smaller, the second aperture stop 5 can be made closer to the light deflecting device 10, to thereby reduce the jitter amount in the main scanning direction.

It is preferred to satisfy 0<M<50 and 100<L<300.

Further, the conditional expressions (1), (2), and (3) are preferred to be set as follows.

$$D \geq |W \cdot La/2f_1| \geq D/6 \quad (1a)$$

$$|La|>2.5 \times f_1 \quad (2a)$$

$$0<M/L<0.5 \quad (3a)$$

Further, in this embodiment, the semiconductor laser 1 as the light source unit includes an 8-beam laser of 50 μm pitch and is inclined by 9.2 degrees with respect to the main scanning direction. The plurality of light emitting portions are aligned in the main scanning direction in the one-dimensional manner, and hence an optical zooming factor in the sub scanning direction can be increased. Therefore, the light emitting portion spacing of the semiconductor lasers can be increased.

Figure 3:
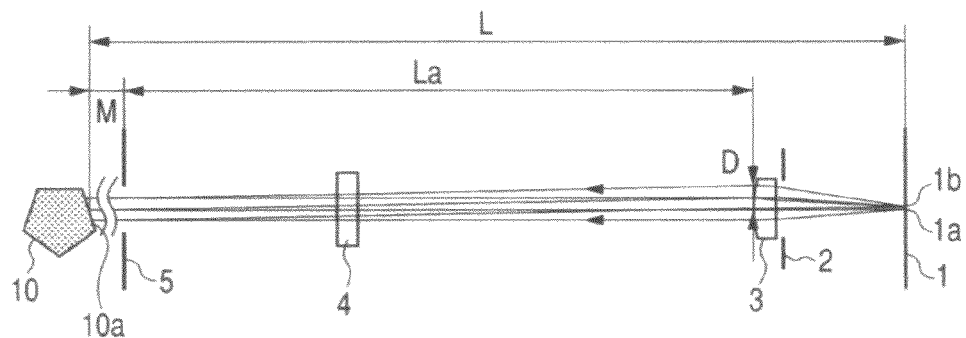
FIG. 3 illustrates a main scanning section of an incident optical system according to the first embodiment of the present invention.

FIG. 3 illustrates a schematic diagram of the incident optical system from the light source unit 1 to the light deflecting device 10 illustrated in FIG. 1. In FIG. 3, the element that is the same as the element illustrated in FIG. 1 is denoted by the same reference symbol. Among the above-mentioned eight light emitting portions (light emitting points) illustrated in FIG. 5, the light emitting portion 1*b* disposed at the position farthest from the optical axis of the collimator lens 3 in the main scanning direction is at the position 0.175 mm away in the main scanning direction.

Figure 4:
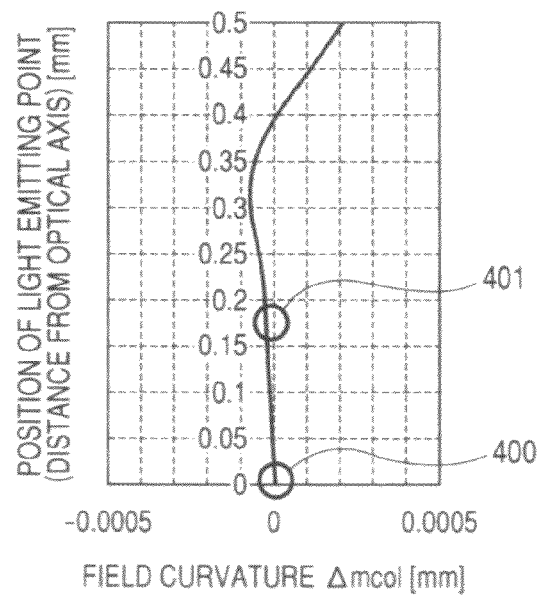
FIG. 4 illustrates a field curvature of the incident optical system according to the first embodiment of the present invention.

FIG. 4 illustrates the field curvature in the main scanning direction and in the sub scanning direction, which occurs in the collimator lens 3.

In FIG. 4, the field curvature shape in the main scanning direction is the same as the field curvature shape in the sub scanning direction.

In FIG. 4, the vertical axis represents a position of the light emitting portion in the main scanning direction, and the horizontal axis represents a field curvature amount of the collimator lens 3. The coordinate position 400 (horizontal axis=0) indicates a focal position of the off axis light emitting portion 1*a* at a vicinity of the optical axis, and the coordinate position 401 (horizontal axis=0.17) indicates the field curvature of the farthest off axis light emitting portion 1*b*.

As understood from FIG. 4, the off axis light emitting portion 1*a* (400 in FIG. 4) at a vicinity of the optical axis and the off axis light emitting portion 1*b* (401 in FIG. 4) farthest in the main scanning direction have different coordinates in the horizontal axis.

In other words, the light fluxes from the off axis light emitting portion 1*a* at a vicinity of the optical axis and the farthest off axis light emitting portion 1*b* form images at positions shifted from each other in the focusing direction in the main scanning direction (X-axis direction) on the surface to be scanned.

The light emitting portion 1*a* at a vicinity of the optical axis has a zero design focus shift in the main scanning direction on the surface to be scanned, and the focal position of the farthest off axis light emitting portion 1*b* in the main scanning direction on the surface to be scanned is shifted by ΔM expressed by the following equation.

$$\Delta M = \Delta mcol \times (f_{f\theta}/f_1)^2$$

where:

|Δmcol| denotes a field curvature difference between the light emitting portion 1*a* and the light emitting portion 1*b* in the main scanning direction of the incident optical system LA;

$f_{f\theta}$ denotes a focal length of the imaging optical system 6 in the main scanning section; and $f_1$ denotes a focal length of the collimator lens 3.

In addition, as illustrated in FIG. 4, the incident optical system LA of this embodiment has a structure in which the field curvature is well compensated even if the light emitting portion is at a position 0.5 mm away from the optical axis, and the focal difference between the light emitting portions in the main scanning direction on the surface to be scanned can be suppressed even if a semiconductor laser having a space of W=1.0 mm between the light emitting portions that are farthest from each other in the main scanning direction is used.

Figure 6:
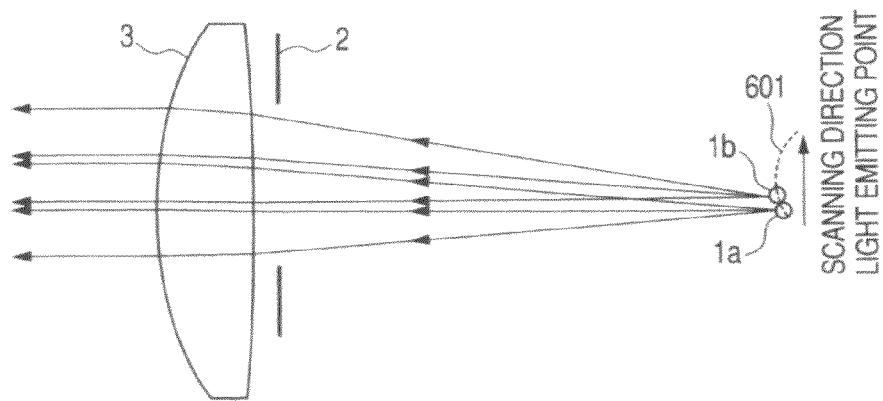
FIG. 6 is an enlarged view of the light source unit and a collimator lens according to the first embodiment of the present invention.

FIG. 6 illustrates an enlarged view of the collimator lens 3 at a vicinity of the light source unit 1. In FIG. 6, the element that is the same as the element illustrated in FIG. 1 is denoted by the same reference symbol.

The light fluxes from the off axis light emitting portion 1*a* at a vicinity of the optical axis and the off axis light emitting portion 1*b* farthest in the main scanning direction are emitted from the cylindrical lens 4 illustrated in FIG. 3 with substantially the same angle of divergence. This indicates that the plurality of light fluxes emitted from the collimator lens 3 have no field curvature in the main scanning direction. If the collimator lens 3 has a field curvature in the main scanning direction, a difference between the angles of divergence occurs.

In general, in order to reduce the field curvature, the following values should be set appropriately:

(a) Petzval sum (lens power); (b) Aspheric surface shape; and (c) Light emitting portion spacing.

In this embodiment, the setting is made as follows:

$f_1$=24.9 mm; W=0.35 mm; La=111.48 mm; and D=4.0 mm.

Therefore, the following equation holds:

$$|W \cdot La/2f_1|=0.35 \times 111.48/2 \times 24.9=0.78.$$

This satisfies the above-mentioned conditional expression (1). Thus, in this embodiment, the light fluxes passing through the collimator lens 3 can be separated. Therefore, an appropriate aspheric surface amount can be set in the collimator lens 3.

Accordingly, the focal difference on the surface to be scanned in the main scanning direction between the off axis light emitting portion 1*a* at a vicinity of the optical axis and the off axis light emitting portion 1*b* farthest in the main scanning direction can be suppressed.

Further, in this embodiment, the setting is made as follows:

La=111.48 mm; $f_1$=24.9 mm, M=22.5 mm; and L=169.8 mm.

Therefore, the following equations hold:

|La|=111.48 mm; $2f_1$=49.8 mm; and M/L=22.5/169.8=0.133.

This satisfies the above-mentioned conditional expressions (2) and (3).

Note that, in this embodiment, when a focus shift amount on the surface to be scanned in the main scanning direction occurs by 1 mm, a jitter amount in the main scanning direction corresponds to a writing misregistration amount ΔY. In this case, the jitter amount in the main scanning direction (writing misregistration amount ΔY) is expressed as follows.

$$\Delta Y = M \times W/(f_1 \times f_{f\theta}) \quad (5)$$

Therefore, the writing misregistration amount $\Delta Y$ of this embodiment has a value as follows.

$$\Delta Y = 22.5 \times 0.35/(24.9 \times 200) = 1.58 \ \mu m.$$

Further, in this embodiment, image writing resolution in the main scanning direction is 1,200 dpi. Therefore, the writing misregistration amount $\Delta Y$ (1.58 μm) is equal to or smaller than ¼ of 1 pixel (21.2 μm), and does not affect the image.

In this embodiment, the first aperture stop (sub scanning aperture stop) 2 is disposed between the light source unit 1 and the collimator lens 3, and is at the position that is 4.0 mm away from the incident surface r1 of the collimator lens 3 (surface on light source unit side). This is because of the purpose for locating the exit pupil position of the imaging optical system 6 in the sub scanning direction away from the surface to be scanned so that a pitch distance in the sub scanning direction does not change even if the surface to be scanned is shifted in the optical axis direction.

Note that, in this embodiment, the exit pupil position in the sub scanning direction is located on the second imaging lens 6b, and the light fluxes emitted from the plurality of light emitting portions cross in the sub scanning section on the second imaging lens 6b. Therefore, optical performances of the individual light beams in the sub scanning direction can easily meet with each other.

In this embodiment, the focal difference $\Delta M$ in the main scanning direction on the surface to be scanned is expressed as follows.

$$\Delta M = 0.00003 \times (200/24.9)^2 = 0.002 \ mm.$$

Usually, there is no problem if the focal difference $\Delta M$ in the main scanning direction is 2 mm or smaller. However, considering manufacturing errors and assembling errors of optical elements, the focal difference $\Delta M$ needs to be preferably 1 mm or smaller, more preferably 0.5 mm or smaller.

Second Embodiment

Figure 7:
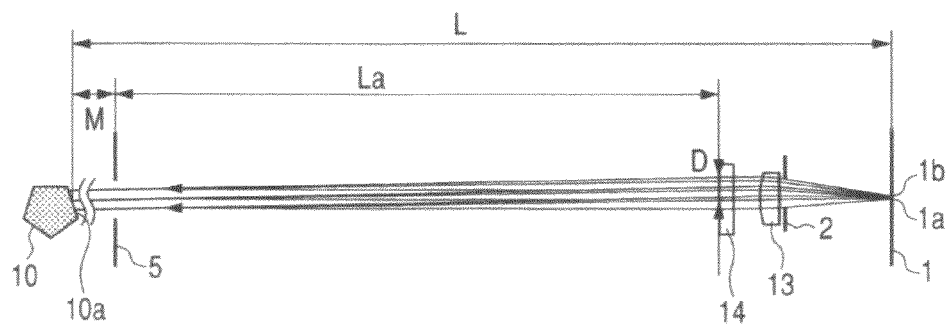
FIG. 7 illustrates a main scanning section of an incident optical system according to a second embodiment of the present invention.

FIG. 7 illustrates a main scanning section of an incident optical system according to a second embodiment of the present invention. In FIG. 7, the element that is the same as the element illustrated in FIG. 1 is denoted by the same reference numeral.

The second embodiment is different from the first embodiment in that the collimator lens 13 is a spherical lens that is rotationally symmetrical to the optical axis, and a shape of the exit surface of the cylindrical lens 14 in the main scanning section is noncircular. Other structures and optical actions are the same as those of the first embodiment.

In other words, in FIG. 7, a collimator lens 13 serves as a first optical element, and is formed of a glass spherical lens that can be manufactured by grinding and is a sphere including an incident surface and an exit surface rotationally symmetrical to each other.

The plastic cylindrical lens 14 serving as the second optical element 14 works so that the light flux that has passed through the collimator lens 3 forms, in the sub scanning section, a linear image elongated in the main scanning direction on the deflection surface 10a of the light deflecting device 10.

The shape of the exit surface of the cylindrical lens 14 in the main scanning section is a noncircular shape in which a convex (positive) power decreases from the optical axis toward the peripheral portion. The incident surface of the cylindrical lens 14 is plane.

In this embodiment, the generatrix of the exit surface of the cylindrical lens 14 has an r component of zero (plane) and the aspheric surface (noncircular) coefficient of fourth or higher order.

Table 3 illustrates values of the incident optical system in this embodiment.

TABLE 3

|  | r | d | N(670 nm) |
|---|---|---|---|
| Light source (light emitting point) | 0.000 | 18.721 | 0.0000 |
| Sub scanning aperture stop |  | 4.000 |  |
| Collimator lens | 100.000 | 4.000 | 1.7670 |
|  | −19.099 | 5.480 | 0.0000 |
| Cylindrical lens | 0.000 | 3.000 | 1.5273 |
|  | 0.000* | 125.500 | 1.0000 |
| Main scanning aperture stop |  | 22.500 |  |
| Deflection surface | 0.000 | 0.000 | 1.0000 |
| Aspheric surface coefficient | | | |
| R | | | 0.00E+00 |
| K | | | 0.00E+00 |
| B4 | | | −1.89E−05 |
| B6 | | | −5.00E−08 |
| B8 | | | 0.00E+00 |
| B10 | | | 0.00E+00 |

*Aspheric surface

Here, the distance La in the conditional expressions (1) and (2) shown in the first embodiment described above corresponds to an optical path length from the noncircular exit surface of the cylindrical lens 14 in the main scanning section to the second aperture stop 5 in the second embodiment.

In addition, the light flux width D of the light flux emitted from the light emitting portion that is farthest from the optical axis of the collimator lens 3 in the main scanning direction in the conditional expression (1) corresponds to a light flux width of the light flux in the main scanning direction on the exit surface of the cylindrical lens 14.

In this embodiment, the setting is made as follows:
$f_1 = 24.9$ mm; W=0.35 mm; La=128.5 mm; and D=4.0 mm. Therefore, the following equation holds:

$$|W \cdot La/2f_1| = 0.35 \times 128.5/2 \times 24.9 = 0.9.$$

This satisfies the above-mentioned conditional expression (1).

Further, in this embodiment, the setting is made as follows:
La=133.98 mm; $f_1$=24.9 mm; M=22.5 mm; and L=160.7 mm.

Therefore, the following equations hold:
|La|=133.98 mm, $2f_1$=49.8 mm; and M/L=0.14.

This satisfies the above-mentioned conditional expressions (2) and (3).

Figure 8:
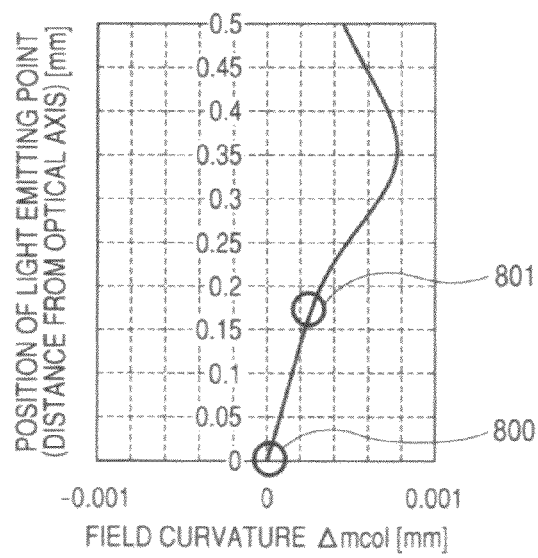
FIG. 8 illustrates a field curvature in a main scanning direction of the incident optical system according to the second embodiment of the present invention.

FIG. 8 illustrates a field curvature in the main scanning direction of the incident optical system LA according to the second embodiment of the present invention. In FIG. 8, numeral 800 denotes a paraxial image surface position of the light emitting portion 1a at a vicinity of the axis, and numeral 801 denotes a paraxial image surface position of the farthest off axis light emitting portion 1b. In addition, the light source unit 1 includes the 8-beam laser arranged in the one-dimensional manner similarly to the first embodiment.

As understood from FIG. 8, a focal difference $\Delta mcol$ is 0.3 μm, and a focal difference $\Delta M$ in the main scanning direction on the surface to be scanned 7 in this embodiment can be expressed by the following equation.

$$\Delta M = |\Delta mcol| \times (f_{fθ}/f_{col})^2$$

where:

|Δmcol| denotes a field curvature difference between the light emitting portion 1a at a vicinity of the optical axis and the light emitting portion 1b farthest in the main scanning direction of the incident optical system LA;

$f_{f\theta}$ denotes a focal length of the imaging optical system 6 in the main scanning section; and $f_{col}$ denotes a focal length of the collimator lens 13.

Therefore, in this embodiment, the following equation holds so that the focal difference ΔM in the main scanning direction on the surface to be scanned 7 is controlled to be 0.5 mm or smaller:

$$\Delta M = 0.0003 \times (200/24.9)^2 = 0.02 \text{ mm}.$$

Note that in this embodiment, the cylindrical lens 14 has the r component of zero, but the r component may be other value than zero so as to be advantageous for molding. In addition, the cylindrical lens 14 may include a diffraction element on the lens surface thereof.

Note that in this embodiment, the exit surface of the cylindrical lens 14 is noncircular in the main scanning section, but this structure should not be interpreted as a limitation. The incident surface or both the surfaces may be noncircular in the main scanning section.

Third Embodiment

Figure 10:
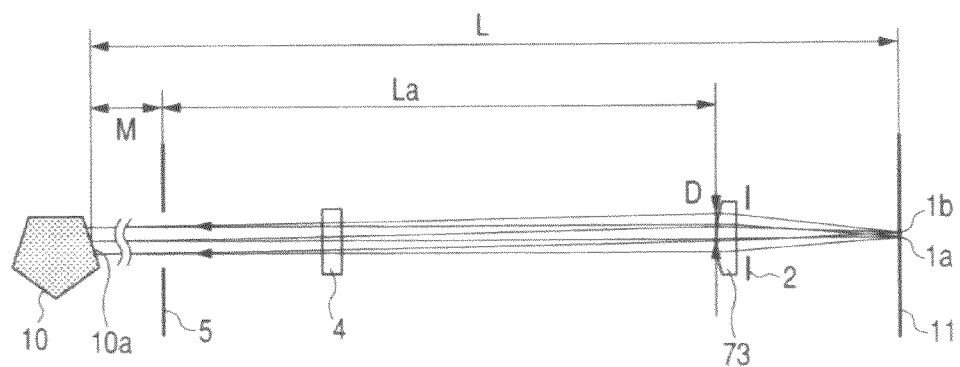
FIG. 10 illustrates a main scanning section of an incident optical system according to a third embodiment of the present invention.

FIG. 10 illustrates a main scanning section of an incident optical system according to a third embodiment of the present invention. In FIG. 10, the element that is the same as the element illustrated in FIG. 1 is denoted by the same reference symbol.

Table 4 illustrates values of the incident optical system in this embodiment.

TABLE 4

|  | r | d | N(670 nm) |
|---|---|---|---|
| Light source (light emitting point) | 0.000 | 19.261 | 0.0000 |
| Sub scanning aperture stop |  | 4.000 |  |
| Collimator lens | 100.000 | 3.000 | 1.5273 |
|  | −14.957* | 43.000 | 0.0000 |
| Cylindrical lens | 0.000 | 3.000 | 1.5273 |
|  | 0.000 | 34.000 | 1.0000 |
| Main scanning aperture stop |  | 22.500 |  |
| Deflection surface | 0.000 | 0.000 | 1.0000 |
| Aspheric surface coefficient | | | |
| A | | 0.00E+00 | |
| B | | 3.05E−05 | |
| C | | −1.00E−07 | |
| D | | 0.00E+00 | |
| E | | 0.00E+00 | |
| F | | 0.00E+00 | |
| G | | 0.00E+00 | |

*Aspheric surface

Figure 12:
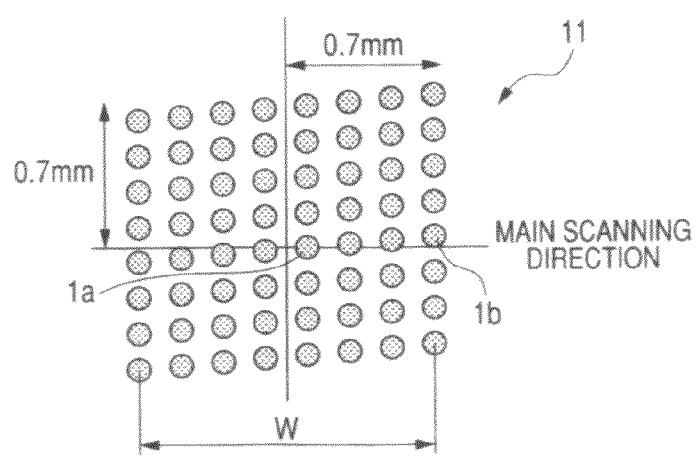
FIG. 12 is a schematic diagram of a light source unit according to the third embodiment of the present invention.

The third embodiment is different from the first embodiment described above in that a collimator lens 73 is formed of a plastic mold lens and that the distance between the collimator lens 73 and the cylindrical lens 4 is decreased compared with the first embodiment. In addition, as illustrated in FIG. 12, a surface light emission laser (VCSEL) including 64 light emitting portions arranged in a two-dimensional manner is used as the light source unit 1. Other structures and optical actions are the same as those of the first embodiment, and similar effects can be obtained.

A light source unit 11 includes a surface light emission laser (VCSEL) having light emitting portions arranged in a two-dimensional array.

In this embodiment, the setting is made as follows:
$f_1$=24.9 mm; W=0.35 mm; La=111.48 mm; and D=4.0 mm.

Therefore, the following equation holds:

$$|W \cdot La/2f_1| = 1.4 \times 80/2 \times 24.9 = 2.2.$$

This satisfies the above-mentioned conditional expression (1) similarly to the first embodiment.

Further, the setting is made as follows:
La=80.0 mm; $f_1$=24.9 mm, M=22.5 mm; and L=106.26 mm.

Therefore, the following equations hold:
|La|=111.48 mm; $2f_1$=49.8 mm; and $$M/L = 22.5/106.26 = 0.14.$$

This satisfies the above-mentioned conditional expressions (2) and (3) similarly to the first embodiment.

Therefore, compared with the first embodiment described above, the third embodiment achieves both the short optical path of the incident optical system and the suppressed focal difference in the main scanning direction on the surface to be scanned 7.

Figure 11:
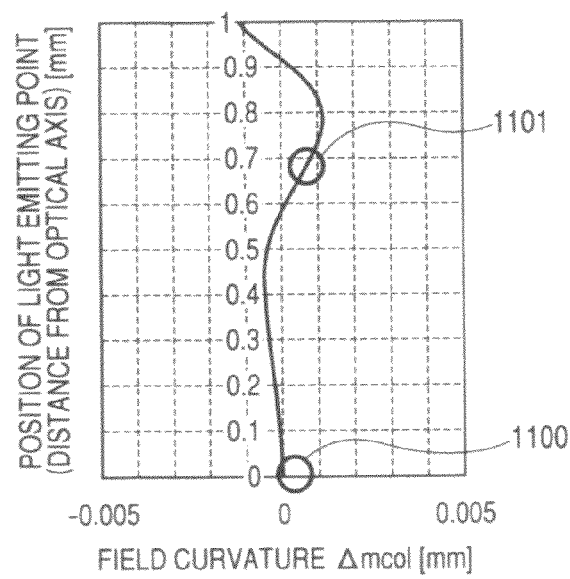
FIG. 11 illustrates a field curvature in a main scanning direction of the incident optical system according to the third embodiment of the present invention.

FIG. 11 illustrates the field curvature in the main scanning direction of the incident optical system LA according to the third embodiment of the present invention. In FIG. 11, numeral 1100 denotes a paraxial image surface position of the light emitting portion 1a at a vicinity of the axis, and numeral 1101 denotes a paraxial image surface position of the farthest off axis light emitting portion 1b. ΔM is suppressed to be equal to or smaller than 0.5 mm as follows:
Δmcol=0.9 μm;

$$\Delta M = 0.0009 \times (200/24.9)^2 = 0.06 \text{ mm}.$$

Note that the collimator lens 73 in the third embodiment is made of plastic, and hence the focal difference due to environmental change such as temperature change becomes larger than that in the first embodiment. However, focusing on the surface to be scanned can be compensated by using a diffraction element or by being provided with a focal adjustment mechanism.

In the first to third embodiments, both of the number of collimator lenses and the number of cylindrical lenses are one, but may be plural.

In addition, the lens surface having the noncircular shape in which the positive power continuously decreases from the axis toward the off axis in the main scanning section may be disposed to each of the collimator lens and the cylindrical lens.

[Color Image Forming Apparatus]

Figure 13:
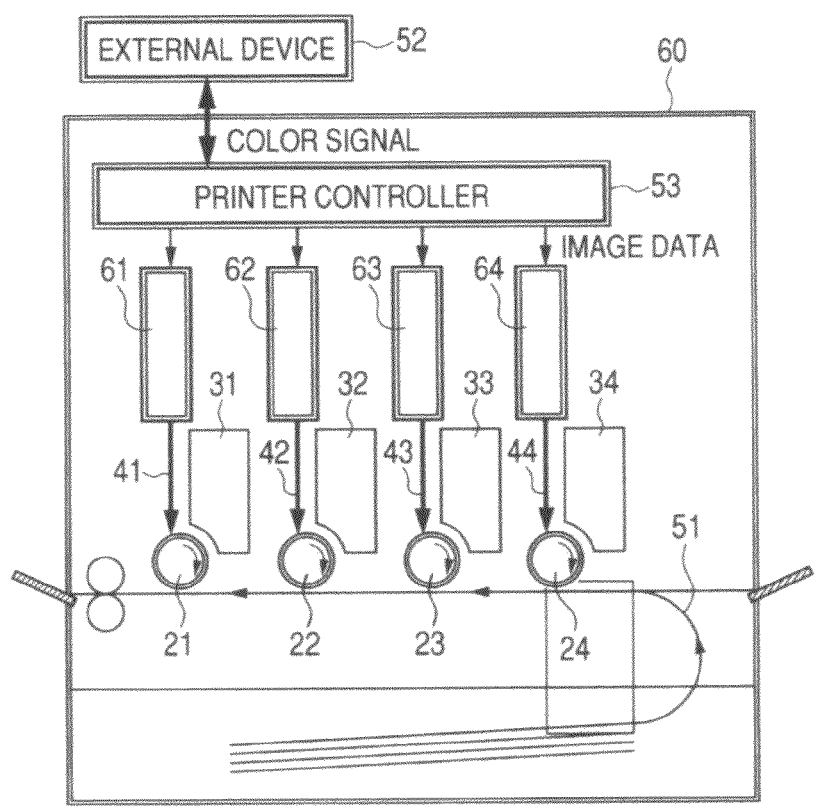
FIG. 13 is a schematic diagram of a color image forming apparatus according to the present invention.

FIG. 13 is a main portion sectional view of a color image forming apparatus according to an embodiment of the present invention. The color image forming apparatus of this embodiment is of tandem type, which includes four optical scanning apparatuses (optical imaging systems) arranged side by side to record concurrently image information on surfaces of photosensitive drums, which serve as image bearing members. FIG. 13 illustrates a color image forming apparatus 60, optical scanning apparatuses 61, 62, 63, and 64 structured as illustrated in any one of the first to third embodiments, photosensitive drums 21, 22, 23, and 24 serving as image bearing members, developing devices 31, 32, 33, and 34, and a conveyor belt 51. It should be noted that, in FIG. 13, there are provided a transferring device (not shown) for transferring a toner image developed by the developing device onto a transfer material, and a fixing device (not shown) for fixing the transferred toner image on the transfer material.

In FIG. 13, respective color signals of red (R), green (G), and blue (B) are input from an external device 52 such as a personal computer to the color image forming apparatus 60. The color signals are converted into pieces of image data (dot data) of cyan (C), magenta (M), yellow (Y), and black (B) by a printer controller 53 in the color image forming apparatus. The respective pieces of image data are input to the optical scanning apparatuses 61, 62, 63, and 64. Light beams 41, 42, 43, and 44, which are modulated according to the respective pieces of image data, are emitted from the optical scanning apparatuses. The photosensitive surfaces of the photosensitive drums 21, 22, 23, and 24 are scanned with the light beams in a main scanning direction.

In the color image forming apparatus of this embodiment, the four optical scanning apparatuses 61, 62, 63, and 64 are arranged side by side, each corresponding to the respective colors of cyan (C), magenta (M), yellow (Y), and black (B). The optical scanning apparatuses concurrently record the image signals (image information) on the surfaces of the photosensitive drums 21, 22, 23, and 24, and print a color image at high speed.

As described above, the color image forming apparatus of this embodiment uses the light beams which are respectively based on image data and emitted from the four optical scanning apparatuses 61, 62, 63, and 64 to form latent images of four colors on the surfaces of the photosensitive drums 21, 22, 23, and 24 respectively associated with the four colors. The latent images are then transferred to a recording material one on another through multilayer transfer to form one full color image.

The external device 52 may be a color image reading device including a CCD sensor. In this case, the color image reading device and the color image forming apparatus 60 constitute a color digital copying machine.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-287639, filed Nov. 10, 2008, which is hereby incorporated by reference herein in its entirety.

What is claimed is:

1. An optical scanning apparatus, comprising:
   a light source unit including a plurality of light emitting portions that are spaced apart from one another in a main scanning direction;
   a deflection unit for deflecting a plurality of light fluxes emitted from the plurality of light emitting portions for scanning;
   an incident optical system for guiding the plurality of light fluxes emitted from the plurality of light emitting portions to the deflection unit; and
   an imaging optical system for forming images of the plurality of light fluxes deflected for scanning by a deflection surface of the deflection unit on a surface to be scanned, wherein:
   the incident optical system includes an optical element including at least one noncircular optical surface in a main scanning section, and an aperture stop for restricting a light flux width at least in the main scanning direction of the light flux entering the deflection unit, which are disposed in the stated order from a side of the light source unit;
   the noncircular optical surface in the main scanning section of the optical element has a shape in which a positive power decreases from on axis toward off axis; and
   when a space between light emitting portions that are located farthest from an optical axis in the main scanning direction among the plurality of light emitting portions of the light source unit is denoted by W (mm), an optical path length between the aperture stop and an optical surface that is closest to the light source unit among the at least one noncircular optical surface of the incident optical system in the main scanning section is denoted by La (mm), a focal length of the incident optical system in the main scanning direction is denoted by $f_1$ (mm), and a light flux width in the main scanning direction of the light flux that is emitted from the light emitting portion which is located farthest from the optical axis in the main scanning direction on the optical surface closest to the light source unit among the at least one noncircular optical surface in the main scanning section of the incident optical system is denoted by D (mm), the following expression is satisfied $$2D \geq |W \cdot La/2f_1| \geq D/8.$$

2. An optical scanning apparatus according to claim 1, wherein the following expression is further satisfied $$8 \times f_1 > |La| > 2 \times f_1.$$

3. An optical scanning apparatus according to claim 1, wherein the incident optical system includes a first optical element, a second optical element having a power in a sub scanning direction for forming images of the plurality of light fluxes that have passed through the first optical element on the deflection surface of the deflection unit as linear images elongated in the main scanning direction, and the aperture stop, which are disposed in the stated order from the side of the light source unit.

4. An optical scanning apparatus according to claim 3, wherein the optical element including the at least one noncircular optical surface in the main scanning section is the first optical element.

5. An optical scanning apparatus according to claim 3, wherein the optical element including the at least one noncircular optical surface in the main scanning section is the second optical element.

6. An optical scanning apparatus according to claim 1, wherein, when an optical path length between the light source unit and the deflection surface of the deflection unit is denoted by L (mm), an optical path length between the aperture stop and the deflection surface of the deflection unit is denoted by M (mm), the following expression is satisfied $$0 < M/L < 0.6.$$

7. An optical scanning apparatus according to any one of claims 1 to 6, wherein the plurality of light emitting portions includes four or more light emitting portions that are spaced from one another in the main scanning direction.

8. An image forming apparatus, comprising:
the optical scanning apparatus according to claim 1;
a photosensitive member disposed on the surface to be scanned;
a developing device for developing an electrostatic latent image as a toner image that is formed on the photosensitive member with a light beam deflected for scanning by the optical scanning apparatus;
a transferring device for transferring the developed toner image to a transfer material; and
a fixing device for fixing the transferred toner image on the transfer material.

9. An image forming apparatus, comprising:
the optical scanning apparatus according to claim 1; and
a printer controller for converting code data supplied from an external device into an image signal, which is supplied to the optical scanning apparatus.

* * * * *